Oct. 9, 1945.  W. I. HANRAHAN  2,386,312
DRUM CHIME AND HEAD
Original Filed May 14, 1943   2 Sheets-Sheet 1
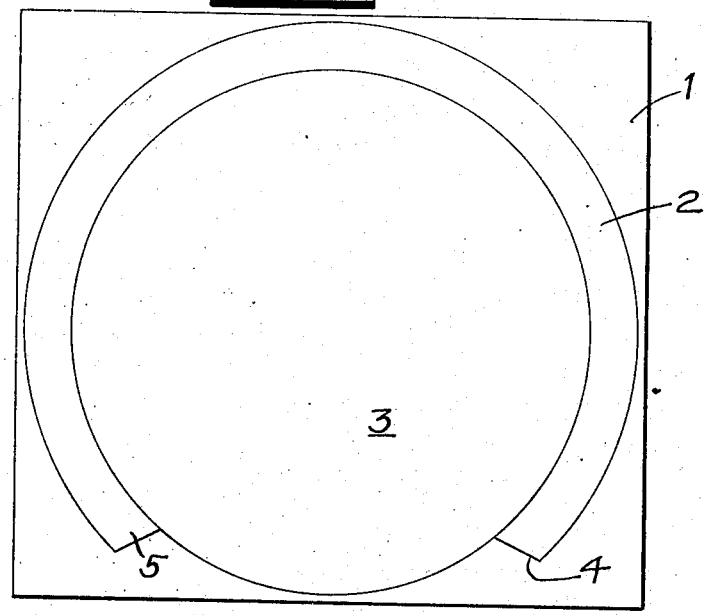
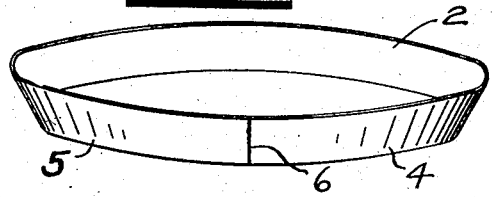
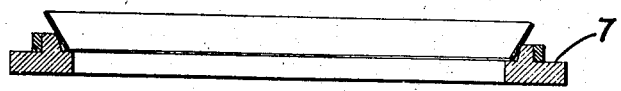
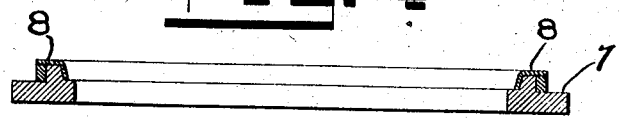
INVENTOR
WILLIAM I. HANRAHAN
By Darley & Darley
ATTORNEYS Oct. 9, 1945.　　　W. I. HANRAHAN　　　2,386,312
DRUM CHIME AND HEAD
Original Filed May 14, 1943　　2 Sheets-Sheet 2
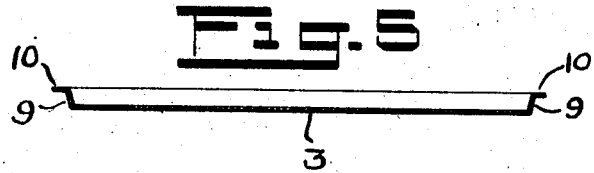
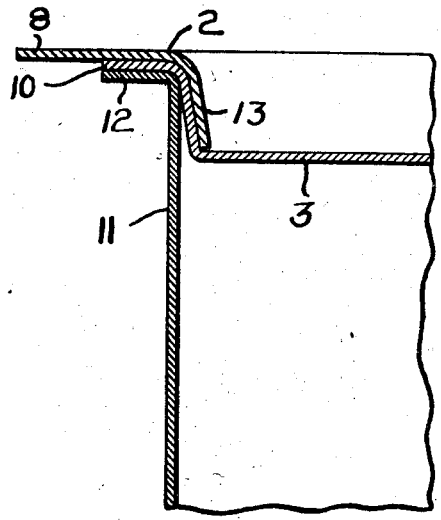
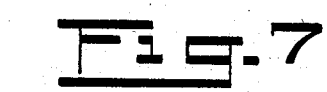
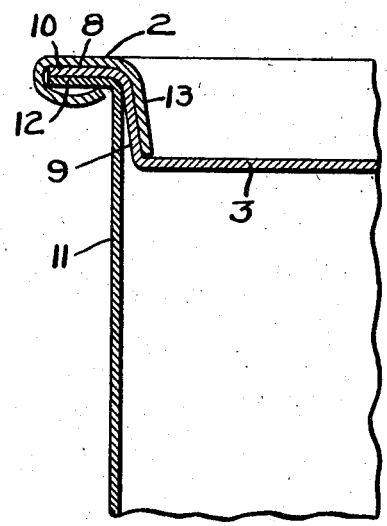
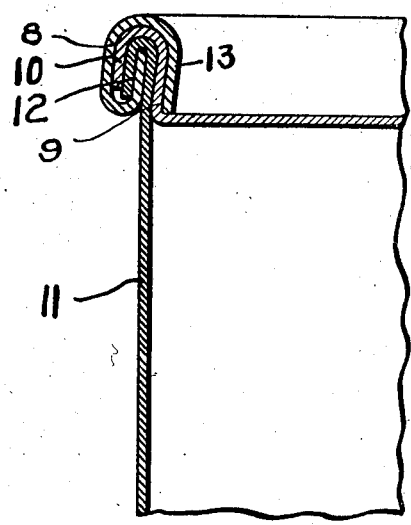
INVENTOR
WILLIAM I. HANRAHAN
By - Darby & Darby
ATTORNEYS Patented Oct. 9, 1945

2,386,312

UNITED STATES PATENT OFFICE 2,386,312

DRUM CHIME AND HEAD

William I. Hanrahan, Bronxville, N. Y., assignor to United States Steel Products Company, Sharon, Pa., a corporation of Delaware Original application May 14, 1943, Serial No. 486,994. Divided and this application October 14, 1943, Serial No. 506,134

1 Claim. (Cl. 220—67)

This application is a division of my copending application Serial No. 486,994, filed May 14, 1943.

The invention relates to the method of making drum chimes and drum heads and also to the method of attaching the same to a drum structure.

One of the objects of the invention is to provide a simple and efficient method of making a chime for use in securing a drum head to a drum.

A further object of the invention is to provide a method of making a chime ring and a drum head from one blank of metallic material for use in connection with a drum structure.

A further object is to provide a novel method of attaching a chime and a drum head to a drum and so that said chime and head will be securely held in place with respect to the drum.

Other objects of the invention will become apparent from the following detailed description, reference being had to the accompanying drawings, wherein:

Figure 1 is a plan view of a blank of metallic material from which is produced the chime and the drum head;

Figure 2 is a perspective view of the chime after being taken from the blank of metallic material and after it has been formed into a ring by the welding of its ends together;

Figure 3 is a sectional view of the chime ring in position in the lower portion of a die used for shaping the ring for use in carrying out the objects of my invention;

Figure 4 is a sectional view of the chime ring in position in the lower portion of the die and after the shaping operation has been completed;

Figure 5 is a sectional view of the drum head taken from the metallic blank of material and after it has been shaped for use in connection with a drum; and Figures 6, 7 and 8 are detail sectional view indicating the steps taken in securing the chime and drum head in place with respect to a drum body in accordance with my invention.

Referring more particularly to the several views of the drawings, it will be noted from Figure 1 that I propose to stamp out or cut a blank to form the chime and the drum head, from the same piece of metallic material indicated at 1. The chime blank to be taken from the metallic material, which is U-shaped in form, is indicated in this figure at 2 and the circular shaped drum head is indicated at 3. By producing the chime blank and the drum blank in this manner the operation can be simply and efficiently accomplished in one operation, and with a considerable saving of material.

After the U-shaped blank for the chime has been taken from the metallic material 1, its ends 4 and 5 are flash welded together as indicated at 6 in Figure 2, and so that the said blank will be formed into a ring. The chime ring thus formed is then placed in a suitable die, indicated at 7 in Figure 3, and said die causes the metal of the chime ring to be bent so that a horizontal extending flanged portion 3 is formed around its upper edge.

The drum head blank 3, after being stamped or cut out of the metallic material 1, is also caused to be shaped by a suitable die and so that it is formed into a cup shaped structure as shown in Figure 5, which has the angularly and upwardly extending side portion 9 and the horizontally extending flanged portion 10.

In the sectional views of Figures 6, 7 and 8, I have indicated the steps taken, in accordance with my invention, for securing the chime ring 2 and the drum head 3 to a drum. In these figures the drum is indicated by the numeral 11. The drum is provided with an open end having a rim portion formed with a flange 12. The drum head 3 is adapted to be fitted into the open end of the drum and so that its flanged portion 10 will rest upon the flange 12. Then the chime ring 2 is positioned with respect to the drum head and drum, as shown in Figure 7, and so that its side portion will lie against the side portion 9 of the drum head and its flanged upper edge 8 will rest on top of the flange 10 of said drum head.

After the chime and drum head are thus assembled with respect to the drum, a suitable sealing mechanism is then employed to bend the flanged portions of the chime ring, drum head, and the drum rim, so that they will become securely interlocked with each other and will be formed into a round upper edge for the drum as shown in Figure 8.

It will be noted from an examination of Figures 6, 7 and 8 that during the operation of the sealing mechanism, the flange 8 of the chime ring is first bent over and under the flanges 10 and 12 of the drum head and drum as indicated in Figure 7, and then all three of said flanges are further bent into the interlocking engagement shown in Figure 8. It will be further noted that during the operation of the sealing mechanism the ring portion 13 of the chime and the angularly extending side portion 9 of the drum head 3 are pressed inwardly against the wall of the drum and caused to become tightly compressed with respect thereto and also the side of the drum is caused to be distorted slightly inwardly (see Fig. 8) so as to make a liquidtight joinder of the drum head with the drum.

It is also contemplated in carrying out the objects of my invention that the flange 10 of the drum head may be made of the same width as the flange 8 of the chime and that during the operation of the sealing mechanism the flange 8 of the chime ring and the flange 10 of the drum head be first bent together over and under the flange 12 of the drum head, and then all three of said flanges bent into interlocking engagement as indicated in Figure 8.

What is claimed is:

In a drum construction, the combination of a drum body having an outwardly extending flange at its upper open end, a drum head for closing the open end of the drum having a cup-shaped body with an angularly extending side wall and an outwardly extending flange at its upper edge which overlaps the drum flange, a chime ring fitted against the inner face of the side wall of the drum head and having an outwardly extending flange at its upper edge which is wider than the drum head flange and which overlaps the drum head flange, the outer end of the said flanged portion of the chime ring being bent around the outer ends of the drum and drum head flanges, and the bent portion of the flange of the chime ring and the flanges of the drum head and drum being bent into interlocking relation with respect to each other, and the chime ring and the angularly extending side wall of the cup-shaped drum head being pressed against the wall of the drum, and so as to distort said wall inwardly.

WILLIAM I. HANRAHAN.